United States Patent
Kawai

(10) Patent No.: US 7,255,320 B2
(45) Date of Patent: Aug. 14, 2007

(54) MOLD FOR A PLASTIC FILTER

(75) Inventor: Chihiro Kawai, Toyohashi (JP)

(73) Assignee: Juken Fine Tool Co., Ltd., Aichi-ken (JP)

( * ) Notice: Subject to any disclaimer, the term of this patent is extended or adjusted under 35 U.S.C. 154(b) by 166 days.

(21) Appl. No.: 10/992,372

(22) Filed: Nov. 18, 2004

(65) Prior Publication Data

US 2006/0051450 A1   Mar. 9, 2006

(30) Foreign Application Priority Data

Sep. 6, 2004   (JP) ............................. 2004-258781

(51) Int. Cl.
   *B28B 7/20*   (2006.01)
   *B28B 21/86*   (2006.01)
(52) U.S. Cl. ..................... 249/184; 425/468; 425/812
(58) Field of Classification Search ............... 425/812, 425/441, 468, 190, 405.1; 249/184
   See application file for complete search history.

(56) References Cited

U.S. PATENT DOCUMENTS

| | | | |
|---|---|---|---|
| 3,266,767 A * | 8/1966 | Long ........................... | 249/181 |
| 3,443,281 A * | 5/1969 | Walby ........................ | 249/141 |
| 4,319,872 A * | 3/1982 | Lupke et al. ............... | 425/532 |
| 4,691,431 A * | 9/1987 | Hayata ....................... | 76/101.1 |
| 5,635,126 A * | 6/1997 | Nomura et al. ............. | 264/334 |
| 5,702,731 A * | 12/1997 | Hayakawa et al. ......... | 425/125 |
| 5,798,076 A * | 8/1998 | Ladouce ..................... | 264/326 |
| 5,866,171 A * | 2/1999 | Kata ........................... | 425/46 |
| 6,382,943 B1 * | 5/2002 | Metz et al. ................... | 425/46 |
| 6,756,553 B1 * | 6/2004 | Yamaguchi et al. ........ | 200/339 |
| 6,877,974 B2 * | 4/2005 | Puniello et al. ............. | 425/116 |
| 2004/0232599 A1 * | 11/2004 | Soulalioux .................. | 264/326 |

FOREIGN PATENT DOCUMENTS

JP    10-193405    7/1998

* cited by examiner

*Primary Examiner*—Yogendra N. Gupta
*Assistant Examiner*—Emmanuel S. Luk
(74) *Attorney, Agent, or Firm*—Jordan and Hamburg LLP

(57) ABSTRACT

A mold, for molding a cylindrical filter having a narrow-pitched mesh structure through resin injection molding, has a cavity divided into sections radially freely attachable/detachable. The sections of the cavity being formed as stacked assemblies bodies each having a number of thin plates, and with edge portions of alternating ones of the thin plates projecting further radially inward than edge portions of interposed alternating ones of the thin plates A core fits in the cavity a defines inside surface of the mesh structure. Air existing between the core and the cavity is externally released from gaps in the stacked thin plates during resin injection.

3 Claims, 5 Drawing Sheets

MOLD FOR A PLASTIC FILTER

BACKGROUND OF THE INVENTION

1. Field of the Invention

The present invention relates to a mold for manufacturing a finely meshed plastic filter.

2. Description of the Related Art

To integrally mold a filter having a narrow-pitched mesh structure through injection molding, the gas or air must be completely removed from inside the mold. For the mold core and cavity to achieve this purpose, a porous sintered metal has been conventionally used in which gaps are formed between metal particles. The air inside the mold was externally released from between the metal particles.

On the other hand, the mold disclosed in Japanese Patent Application Laid-Open Publication No. 1998-193405 is formed with air bleeding guide paths communicating with the cavity.

The drawback to providing the core or cavity with a porous sintered metal is that the porous surface will gradually become blocked with resin, eventually resulting in failure to bleed the air. Moreover, the air bleeding guide paths of the aforementioned patent document are cumbersome to manufacture and likely permit entry of resin therein. And, in any case, the manufacture of the conventional molds has been cumbersome, resulting in a high mold cost.

SUMMARY OF THE INVENTION

In light of the foregoing, it is an object of the present invention to provide a mold for a fine-pitched cylindrical filter that is capable of externally releasing the air from inside the core and remains unblocked by solving the drawbacks.

In order to achieve the above object, according to an aspect of the present invention there is provided a mold for a plastic filter, the mold having a cylindrical space for molding a filter formed between the outer circumference of a core and the inner circumference of a cavity, wherein the cavity is made up of at least a pair of divisions that divide in such a manner as to be freely attachable/detachable in the direction away from a center line of the cylindrical space, wherein the divisions have each a stacked body formed by stacking a number of thin plates that have an inner circumference coinciding with each of horizontal cross-sections of the inner circumference of the cavity, the inner circumferential edge of one of the adjacent thin plates slightly projecting more toward the center line than that of the other thin plate to form horizontal ridges, with a number of groove portions formed between the adjacent horizontal ridges, wherein the inner end surface of each of the horizontal ridges is in contact with the outer circumference of the core, and wherein air existing between the core and the cavity is externally released from gaps in the stacked thin plates during resin injection.

The outer circumference of the core is formed with vertical ridges extending along the center line that are spaced apart from each other in the circumferential direction thereof, with a number of vertical groove portions being formed between the adjacent vertical ridges, and the vertical ridges are arranged such that the outer end surface of each of the vertical ridges is in contact with and intersects the inner end surface of each of the horizontal ridges of the cavity.

In order to attain the above object, according to another aspect of the present invention there is provided a mold for a plastic filter, the mold having a cylindrical space for molding a filter formed between the outer circumference of a core and the inner circumference of a cavity, wherein the cavity is made up of at least a pair of divisions that divide in such a manner as to be freely attachable/detachable in the direction away from the center line of the cylindrical space, wherein the core has a stacked body formed by stacking a number of thin plates of the same geometry in the direction of the center line, the outer circumference of the core being formed with a number of vertical ridges extending along the center line that are spaced from each other in the circumferential direction of the core, with vertical groove portions formed between the vertical ridges, wherein the outer surface of the vertical ridges is in contact with the inner surface of the cavity, and wherein air existing between the core and the cavity is externally released from gaps in the stacked thin plates during resin injection.

According to the mold for a plastic filter of the present invention, a cylindrical plastic filter can be manufactured in which slits (gaps), each measuring equal to the thickness of a thin plate 3b, are formed in the direction of stacking thin plates 3a and 3b. Therefore, a filter can be manufactured having a large number of slits that are thin to the extent possible by selecting the thickness of the thin plate 3b.

On the other hand, the air inside groove portions 4 is externally released from gaps in the individual thin plates 3a and 3b during resin injection, allowing molten resin to be reliably guided into the groove portions 4 and providing a highly accurate mold for a plastic filter.

Further, divisions 2a and 2b of a cavity 2 can be divided in the direction away from a center line 25, allowing for easy retrieval of the product after the injection molding.

A number of vertical ridges 5a are provided on the outer circumference of a core 1 and configured so as to be in contact and intersect horizontal ridges 4a of the cavity 2, thus allowing providing a highly accurate meshed filter. That is, the filter has a number of vertical slits formed on the inner circumference and a number of horizontal slits formed on the outer circumference, with horizontal and vertical ribs on both sides of each of the slits connected at the individual intersection portions.

A filter can be provided that is easy to manufacture, that allows the air between the core 1 and the cavity 2 to be reliably released externally and that has fine slits.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Description will be given below of an embodiment of the present invention with reference to the accompanying drawings.

Figure 1:
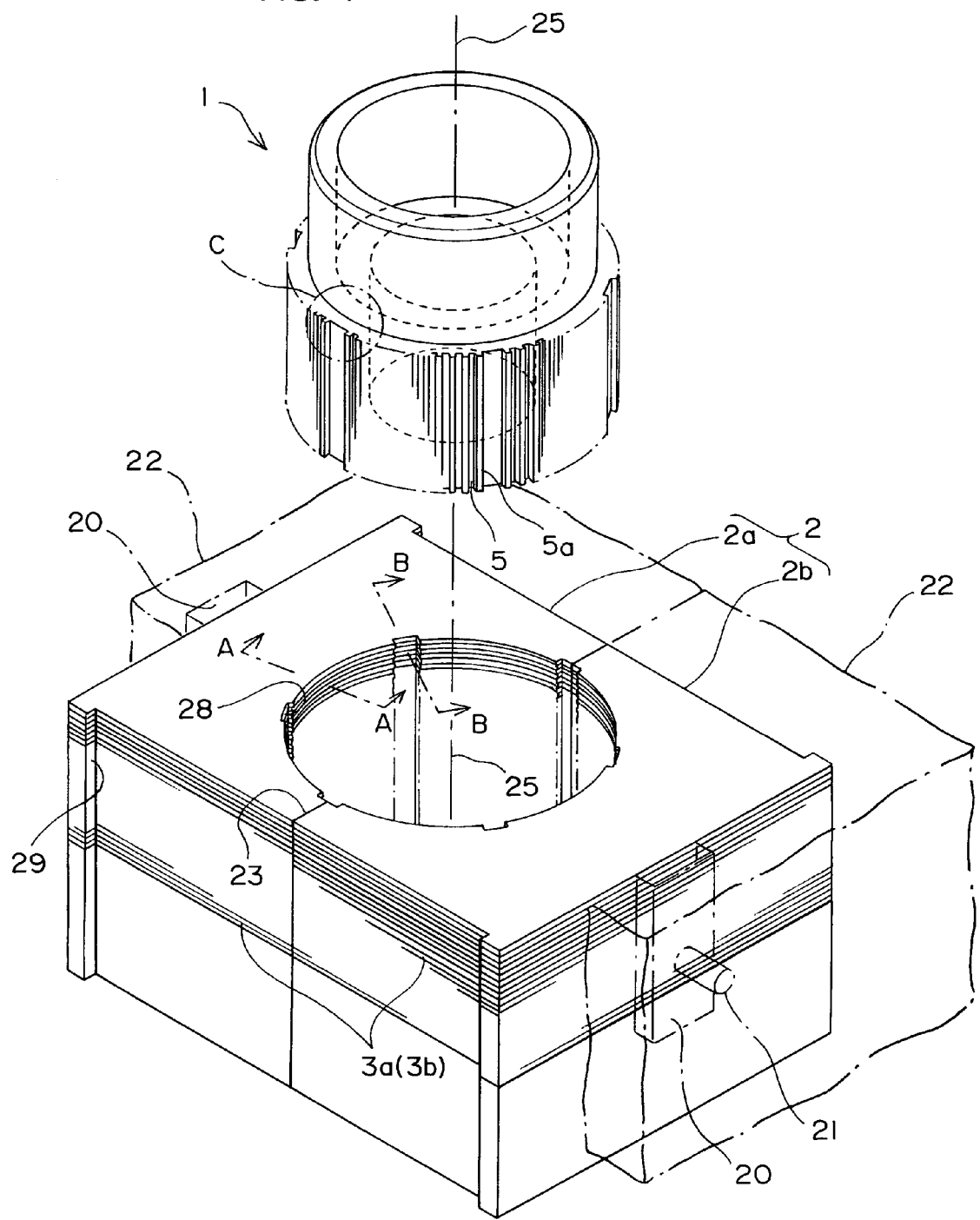
FIG. 1 is a schematic perspective view of a core 1 and a cavity 2 of the present invention.
Figure 2:
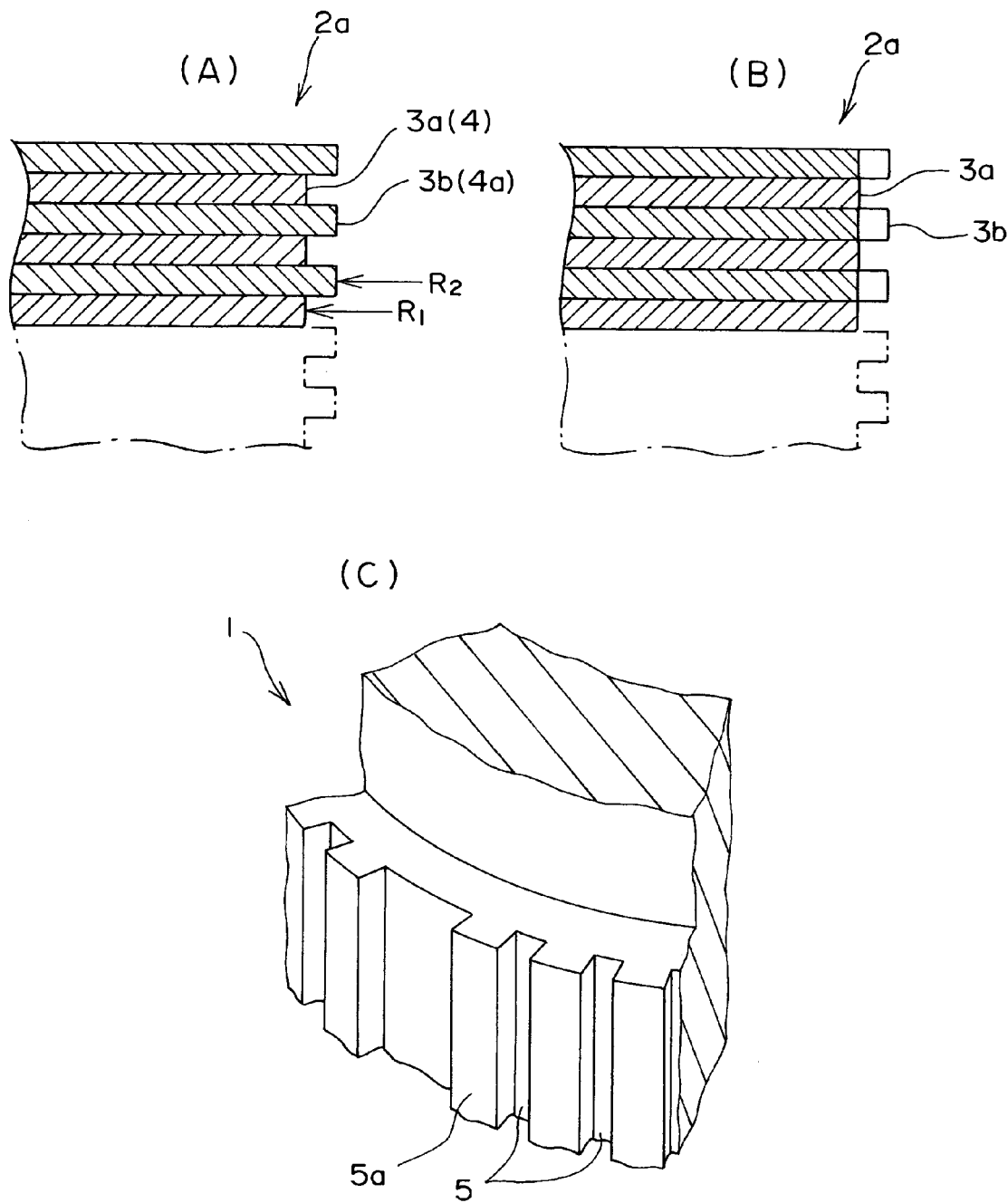
FIGS. 2A, 2B and 2C are enlarged fragmentary views of an A-A cross-section, a B-B cross-section and a C portion, respectively.
Figure 3:
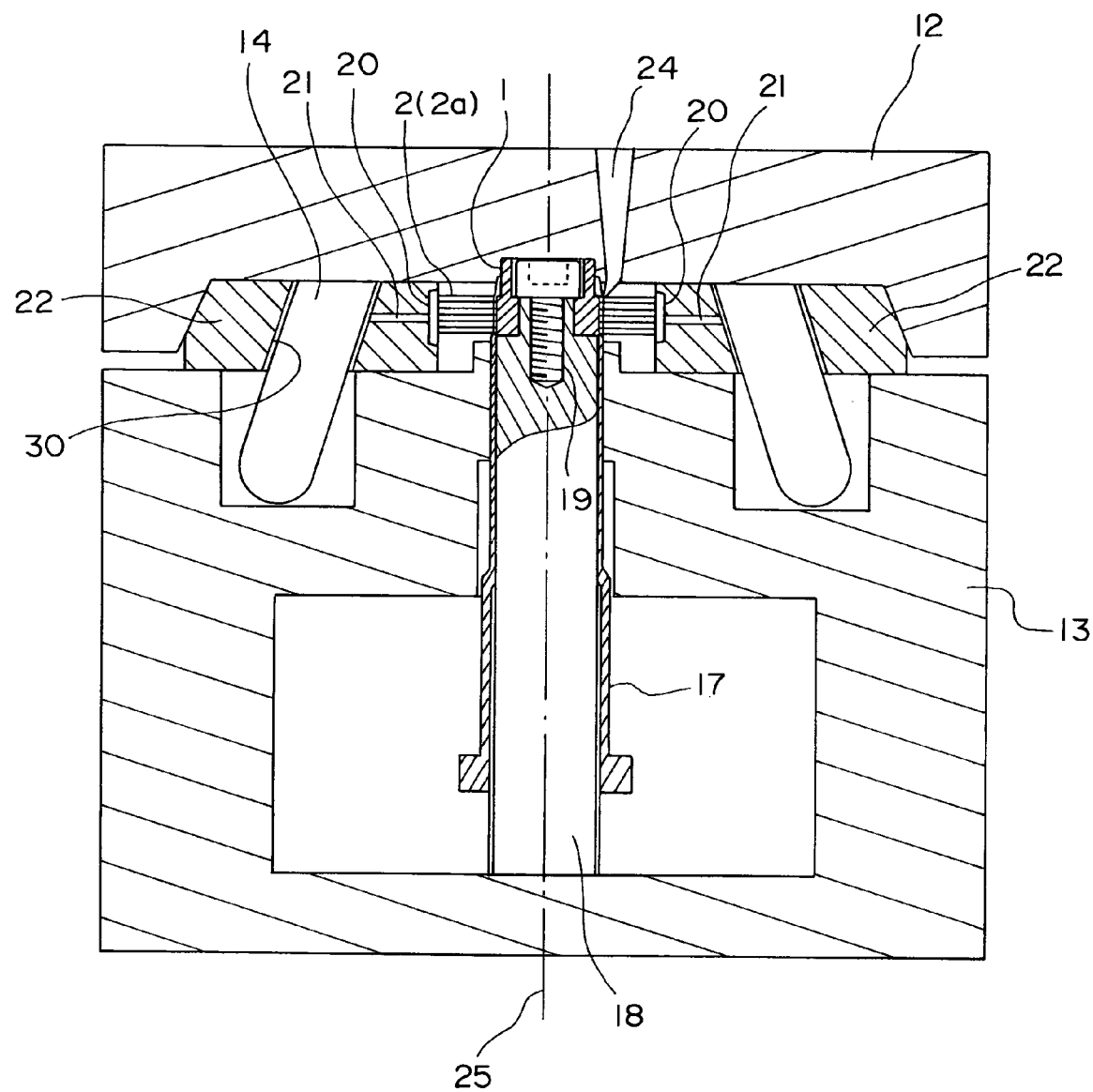
FIG. 3 is a vertical cross-sectional view showing the core 1 and the cavity 2 of the present invention as mounted.
Figure 4:
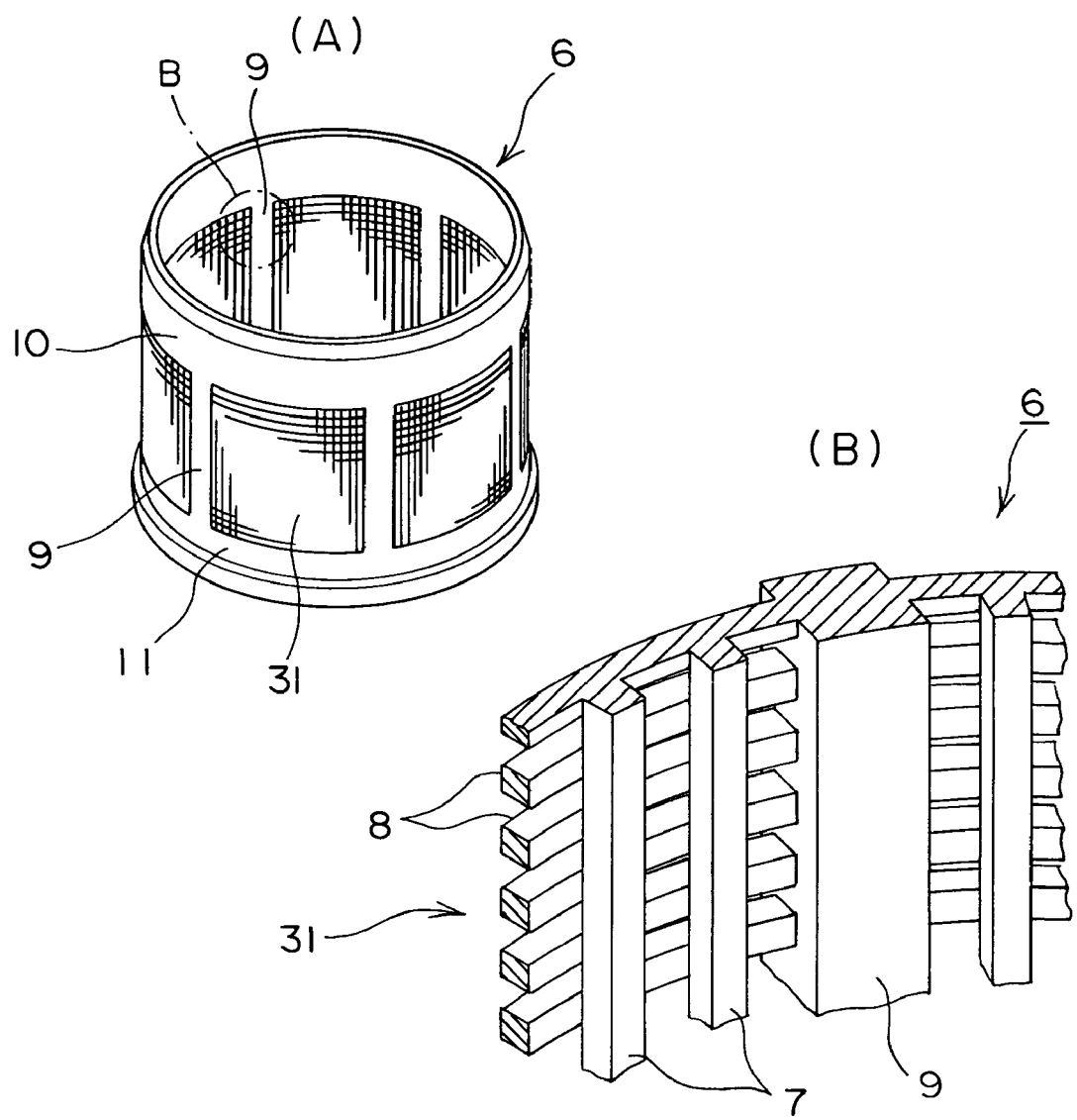
FIGS. 4A and 4B are a perspective view and an enlarged fragmentary view of a B portion, respectively, showing an example of a plastic filter 6 manufactured by the present mold.

FIG. 1 is a schematic view of the core 1 and the cavity 2 for manufacturing a cylindrical plastic filter, whereas FIGS. 2A, 2B and 2C are enlarged fragmentary views of an A-A cross-section, a B-B cross-section and a C portion, respectively. On the other hand, FIG. 3 is a vertical cross-sectional view showing the core 1 and the cavity 2 as mounted. FIG. 4A is a schematic perspective view of an example of a plastic filter 6 manufactured by the mold, whereas FIG. 4B is an enlarged view of a portion B of the plastic filter.

This mold has the core 1 and the cavity 2 as shown in FIG. 1. The core 1 is formed in the shape of a column having a center hole on the outer circumference, with a number of the vertical ridges 5a, spaced from each other in the circumferential direction, formed on the outer circumference of the core 1 in the direction of the center line. A number of vertical groove portions 5 are formed between the adjacent vertical ridges 5a. These vertical groove portions 5 can be formed, for example, by cutting the outer circumference of the columnar body. It is to be noted that the vertical groove portions 5 are formed extremely small in width. And, the vertical groove portions 5 are formed between the adjacent vertical ridges 5a that are formed as shown in FIG. 2C.

Next, the cavity 2 is made up of the divisions 2a and 2b divided into two parts on the diameter line passing through the center line 25 in the direction of the radius. The divisions 2a and 2b are respectively made of stacked bodies in which a number of thin plates 3a and 3b are stacked, with the inner circumferential edge of the thin plate 3b—one of the two adjacent thin plates—slightly projecting more toward the side of the center line 25 than that of the thin plate 3a, thus forming the horizontal ridges 4a. The inner circumference of the cavity 2, formed in cylindrical shape, is formed such that the radius from the center line 25 of the thin plate 3a, one of the radiuses, is slightly larger than that from the thin plate 3b.

Then, a number of the groove portions 4 are formed between the adjacent horizontal lines 4a as shown in FIG. 2A.

It is to be noted that in this example, a plurality of vertical grooves 28 (six in this example) are arranged at constant intervals on the inner circumferential surface of the cavity 2 as shown in FIG. 1. These thin plates 3a and 3b are respectively easily formed by press forming. The thin plates 3a and 3b are each formed rectangular in outer circumference and semi-circular in inner circumference, with a pair of protruding portions for positioning 29 projected at one end of the outer circumference. As shown in FIG. 2A, a semi-circle $R_1$ of the thin plate 3a is formed slightly larger than a semi-circle $R_2$ of the thin plate 3b. The first and second thin plates 3a and 3b are in contact with each other at the surfaces, with a gap formed between the contact surfaces that passes air but does not permit penetration of resin and that is not visibly observable.

These divisions 2a and 2b are fitted into slide cores 22 having a rectangular hole that matches the divisions 2a and 2b as shown in FIG. 1 and positioned by the protruding portions for positioning 29. It is to be noted that the outer surfaces of the divisions 2a and 2b are closed and fixed by an appropriate block material after the fitting. On the other hand, air bleeding grooves 20 are preferably formed in the block material. It is to be noted that the air inside the cavity 2 may be externally guided from the gap between the divisions 2a and 2b of the cavity 2 and the slide cores 22 without providing the air bleeding grooves 20.

Then, being supported by the slide cores 22 in the vertical cross-sectional view as shown in FIG. 3, the cavity 2 is positioned on top of a movable plate 13 and opens/closes in the direction of the radius relative to the center line 25. That is, as the movable plate 13 moves vertically, the divisions 2a and 2b are moved in the direction of the radius by angular pins 14 projected on a fixed plate 12 via slanting holes 30 of the slide cores 22.

Next, the core 1 is fixed, for example, at the edge portion of a main shaft pin 18 fixed on the movable plate 13 via a lock bolt 19 as shown in FIG. 3. In a closed mold condition as shown in FIG. 3, the outer surface of the vertical ridges 5a (FIG. 2C) is in contact and intersects the inner surface of the thin plate 3b of the divisions 2a and 2b.

At this time, a filter space is formed in cylindrical shape between the core 1 and the cavity 2, with a sprue 24 made to communicate with the space via a gate.

Then, pressurized molten resin is injected between the core 1 and the cavity 2 from the sprue 24. At this time, the pressure applied to the resin externally releases the air—air inside a number of the vertical groove portions 5 of the outer circumference of the core 1 and air within a number of the groove portions 4 of the divisions 2a and 2b—in the direction of the radius from the fine gaps in the individual thin plates 3a and 3b, causing the air to flow out of the mold via the air bleeding grooves 20 and air discharge holes 21. This allows resin to be filled completely into the groove portions 4 and the vertical groove portions 5. After the hardening of the resin, as the movable plate 13 moves downward in FIG. 3, the pair of slide cores 22 opens externally in the direction of the radius. It is to be noted that the slide cores 22 are guided so as to be freely slidable on top of the movable plate 13.

Then, the molded product is retrieved externally as an ejector 17 projects upward in the figure.

The molded product thus manufactured is formed as shown in FIGS. 4A and 4B. In this example, the molded product is formed in cylindrical shape, with a plurality of reinforcement portions 9 arranged between upper and lower end portions 10 and 11 and spaced from each other in the circumferential direction. Filter portions 31 are formed between the reinforcement portions 9 and the upper and lower end portions 10 and 11. The filter portions 31 have each a number of parallel horizontal ribs 8 and a number of vertical ribs 7 connecting between the horizontal ribs 8. The vertical and horizontal ribs 7 and 8 are formed in one piece at the intersection portions.

Embodiment

According to the experiment conducted by the present inventors, the slits (gaps) formed between the horizontal ribs 8 in FIG. 4B were successfully made 0.1 mm in height. That is, in FIGS. 2A and 2B, making the thin plate 3a 0.1 mm in thickness allowed the air inside the groove portion 4, formed in the thin plate 3a, to be released externally. On the other hand, the gap between the vertical ribs 7 was successfully made 0.1 mm. This allowed the filter mesh to be 0.1 mm rectangular holes.

<Modification>

Figure 5:
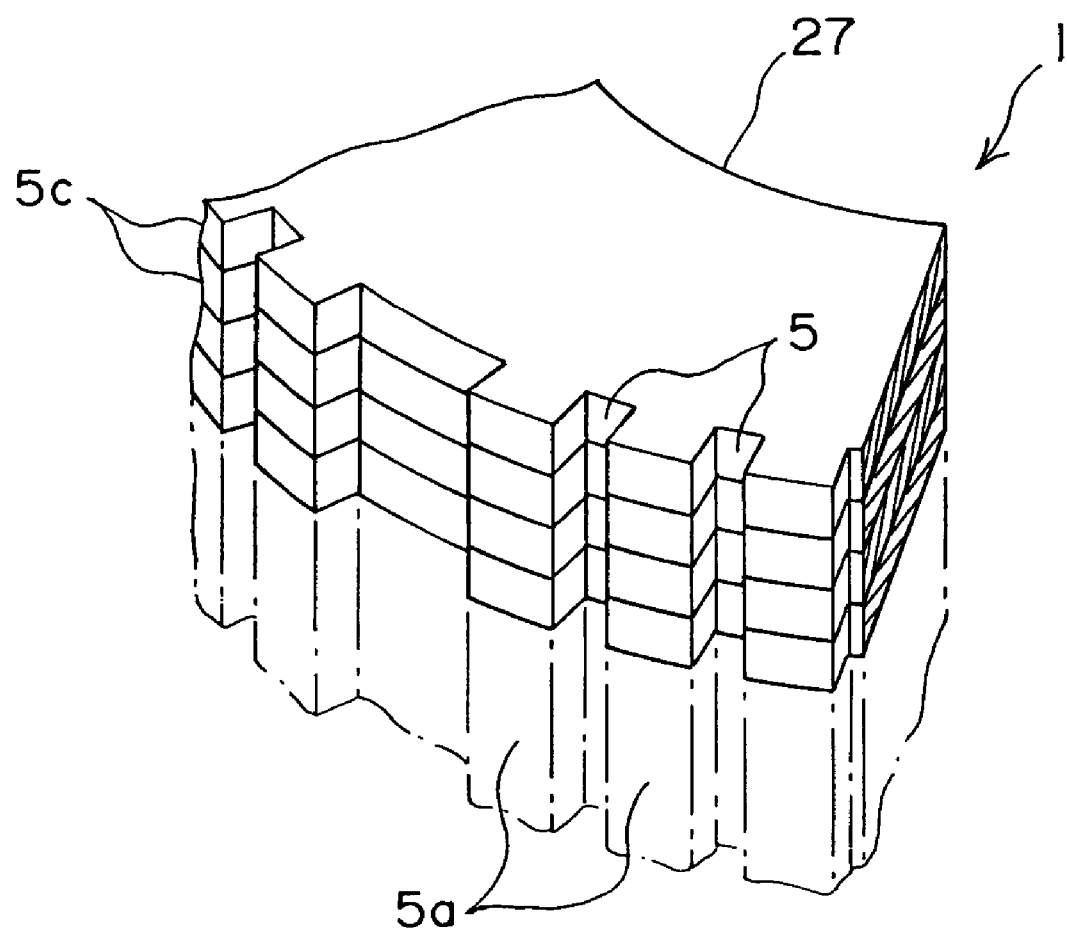
FIG. 5 is an enlarged cross-sectional view showing another example of the core 1 of the present invention.

Next, FIG. 5 shows another embodiment of the core 1 according to the present invention. This example has a number of disk-shaped thin plates 5c stacked in the direction of the center line, with the vertical ridges 5a, spaced from each other in the circumferential direction, formed on the outer circumference of the core 1 in the direction of the center line. The vertical groove portions 5 are formed between the vertical ridges 5a. Such the core 1 is manufactured by stacking plates with gear-shaped projections and depressions formed in advance on the outer circumference through press working or by cutting the vertical groove portions 5 with a number of disks stacked.

Such the core 1 can move the air inside the vertical groove portions 5 from the fine gaps in the individual thin plates 5c toward the center, externally releasing the air from the core 1.

It is needless to say that the present invention is not limited to the aforementioned embodiments, and the plastic filter 6 may have a rectangular horizontal cross-section.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A mold for a plastic filter, comprising:
at least a pair of mold sections defining a cylindrical cavity in an assembled state,
a core fittable in the cylindrical cavity for molding the filter between an outer circumference of the core and inner circumference of the cavity,
the mold sections being freely attachable/detachable in a direction away from a center line of the cylindrical cavity,
the mold sections each being a stacked body formed by stacking a number of thin plates that have inner circumferences defining each of horizontal cross-sections of the inner circumference of the cavity, alternating ones of the inner circumferences projecting further radially inward than interposed alternating other ones of the inner circumferences to form horizontal ridges defining horizontal grooves therebetween,
inner end surfaces of the horizontal ridges being in contact with the outer circumference of the core, and
wherein air existing between the core and the cavity is externally released through gaps between the stacked thin plates during resin injection.

2. A mold for a plastic filter, comprising:
at least a pair of mold sections defining a cylindrical cavity in an assembled state,
a core fittable in the cylindrical cavity for molding the filter between an outer circumference of the core and inner circumference of the cavity,
the mold sections being freely attachable/detachable in a direction away from a center line of the cylindrical cavity,
the mold sections each being a stacked body formed by stacking a number of thin plates that have inner circumferences defining each of horizontal cross-sections of the inner circumference of the cavity, alternating ones of the inner circumferences projecting further radially inward than interposed alternating other ones of the inner circumferences to form horizontal ridges defining horizontal grooves therebetween,
inner end surfaces of the horizontal ridges being in contact with the outer circumference of the core, and
wherein air existing between the core and the cavity is externally released through gaps between the stacked thin plates during resin injection, and
wherein the outer circumference of the core is formed with vertical ridges extending pallel to the center line that are circumferentially spaced apart from each other with a number of vertical groove portions being formed between the adjacent vertical ridges, and wherein the vertical ridges are arranged such that an outer end surface of each of the vertical ridges is in contact with and intersects the inner end surface of each of the horizontal ridges.

3. A mold for a plastic filter, comprising:
at least a pair of mold sections defining a cylindrical cavity in an assembled state;
a core fittable in the cylindrical cavity for molding the filter between an outer circumference of the core and inner circumference of the cavity,
the mold sections being freely attachable/detachable in a direction away from a center line of the cylindrical cavity,
the core being formed by stacking a number of thin plates of like geometry in a direction of the center line, outer circumference of the core being formed with a number of vertical ridges extending parallel to the center line that are circumferentially spaced from each other, with vertical groove portions formed between the vertical ridges,
the vertical ridges having outer surfaces in contact with the inner surface of the cavity,
said core defining an air passage within said core; and
wherein air existing between the core and the cavity is externally released during resin injection through gaps in the stacked thin plates and via said air passage.

* * * * *